United States Patent [19]
Frindel et al.

[11] Patent Number: 4,838,520
[45] Date of Patent: Jun. 13, 1989

[54] VALVE FOR A VACUUM ENCLOSURE

[75] Inventors: Sébastien Frindel, Annecy le Vieux; Jacques Mimeur, Veyrier du Lac, both of France

[73] Assignee: Alcatel Cit, Paris, France

[21] Appl. No.: 207,483

[22] Filed: Jun. 16, 1988

[30] Foreign Application Priority Data

Jun. 16, 1987 [FR] France .................................. 87 08363

[51] Int. Cl.$^4$ .............................................. F16K 25/00
[52] U.S. Cl. .................................... 251/204; 251/159; 251/187
[58] Field of Search ................... 251/159 X, 163, 170, 251/187 X, 203, 204, 901

[56] References Cited

U.S. PATENT DOCUMENTS

| | | |
|---|---|---|
| 1,727,677 | 9/1929 | Siebert et al. |
| 2,952,437 | 9/1960 | Knox .................. 251/187 X |
| 3,254,873 | 6/1966 | Knox .................. 251/171 |
| 3,704,722 | 12/1972 | Coleman .................. 251/203 X |
| 3,828,816 | 8/1974 | Barnebey .................. 137/625.28 |
| 4,219,183 | 8/1980 | Hoffmann et al. .................. 251/159 |
| 4,470,576 | 9/1984 | Schertler .................. 251/204 X |
| 4,509,717 | 4/1985 | Wright et al. .................. 251/159 X |

FOREIGN PATENT DOCUMENTS

| | | | |
|---|---|---|---|
| 1121893 | 5/1956 | Fed. Rep. of Germany ...... | 251/159 |
| 2705060 | 8/1978 | Fed. Rep. of Germany . | |
| 1318759 | 1/1963 | France .................. | 251/159 |
| 1327595 | 4/1963 | France . | |
| 1538390 | 7/1968 | France . | |
| 2283375 | 3/1976 | France . | |

Primary Examiner—A. Michael Chambers
Assistant Examiner—John C. Fox
Attorney, Agent, or Firm—Sughrue, Mion, Zinn, Macpeak, and Seas

[57] ABSTRACT

A valve for a vacuum enclosure, the valve comprising a valve body (1) which is hollow about an axis Δ and which opens out to the outside via two opposite end openings (24, 25) of the valve body, thereby enabling the valve to be inserted in a pumping circuit, the inside of said valve body being provided by closure means constituted by a strip (7) which is movable in its own plane, which plane extends perpendicularly to the axis Δ said strip being provided with at least one opening (8) and being associated with two pay-out and take-up drums (9, 10) provided with drive means, said valve body being further provided with sealing means situated between the two drums and comprising a fixed gasket (15) fixed to the valve body and situated on a first side of the strip and a moving gasket system capable of moving parallel to the axis Δ and situated on the other side of the strip from the fixed gasket, the valve being characterized in that said moving gasket system includes a plurality of balls (30) which are held spaced apart from one another around a circumference by means of a rotatable cage (31), the assembly comprising said balls and said cage being disposed between a clamping ring (34) which is axially displacable and which is provided with conical depressions (35) for receiving the balls and a plane portion (36) of the valve body which is also provided with conical depressions (37) for receiving the balls, said cage (31) being associated with means (32, 33) enabling it to be rotated through an angle α, the clamping ring being axially slidable in sealed manner along a cylindrical bearing surface (40) inside said valve body.

1 Claim, 2 Drawing Sheets

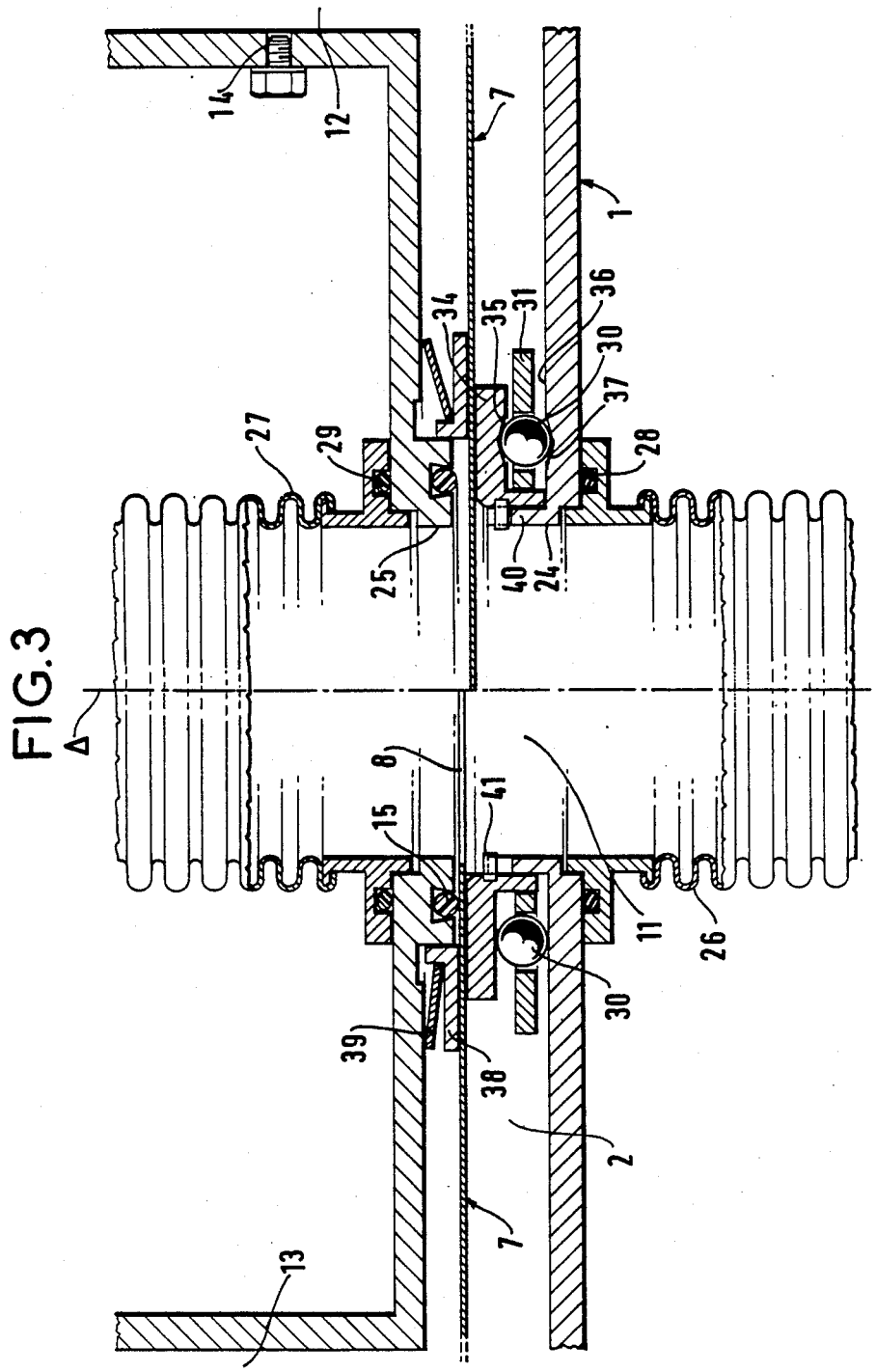

VALVE FOR A VACUUM ENCLOSURE

The present invention relates to a valve for a vacuum enclosure.

BACKGROUND OF THE INVENTION

Membrane valves are known in which closure is obtained by a tape including an opening and capable of moving in its own plane. This type of valve has the advantage of enabling the fluid flow passage to be fully opened, as with a slide valve, but in a more compact configuration.

U.S. Pat. No. US-A-3 828 816 describes a valve of this type in which closure sealing is obtained by the pressure difference existing between the two sides of the closure member.

However, in many applications, the resulting sealing is inadequate.

The object of the present invention is to provide a tape type valve including an effective sealing system while retaining a high degree of compactness.

SUMMARY OF THE INVENTION

The present invention thus provides a valve for a vacuum enclosure, the valve comprising a valve body which is hollow about an axis Δ and which opens out to the outside via two opposite end openings of the valve body, thereby enabling the valve to be inserted in a pumping circuit, the inside of said valve body being provided by closure means constituted by a strip which is movable in its own plane, which plane extends perpendicularly to the axis Δ, said strip being provided with at least one opening and being associated with two pay-out and take-up drums provided with drive means, said valve body being further provided with sealing means situated between the two drums and comprising a fixed gasket fixed to the valve body and situated on a first side of the strip and a moving gasket system capable of moving parallel to the axis Δ and situated on the other side of the strip from the fixed gasket, wherein said moving gasket system includes a plurality of balls which are held spaced apart from one another around a circumference by means of a rotatable cage, the assembly comprising said balls and said cage being disposed between a clamping ring which is axially displacable and which is provided with conical depressions for receiving the balls and a plane portion of the valve body which is also provided with conical depressions for receiving the balls, said cage being associated with means enabling it to be rotated through an angle α, the clamping ring being axially slidable in sealed manner along a cylindrical bearing surface inside said valve body.

In accordance with another characteristic, the valve body includes a return ring situated on the same side of the strip as said fixed gasket and subjected to the force of a return spring directed towards said strip.

BRIEF DESCRIPTION OF THE DRAWINGS

An embodiment of the invention is described by way of example with reference to the accompanying drawings, in which:

FIG. 3 is a fragmentary section view showing a detail of the valve showing in FIGS. 1 and 2, but on a larger scale.

MORE DETAILED DESCRIPTION

The valve in accordance with the invention may be used for making extra-flat valves for use in instrumentation in technologies making use of vacuum beams.

Figure 1:
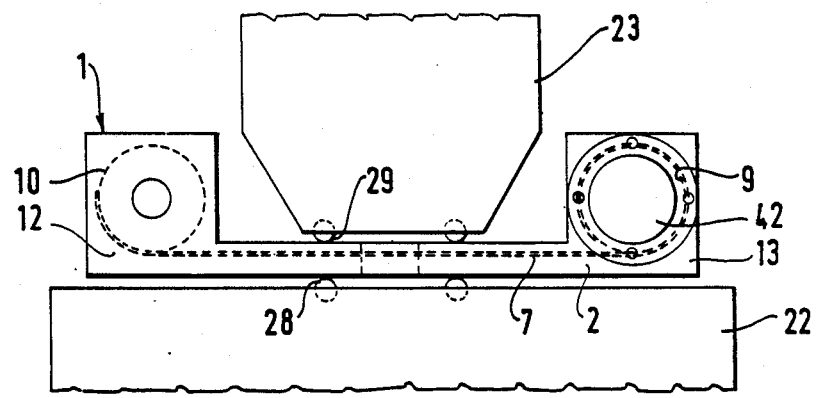
FIGS. 1 and 2 are diagrams showing a valve in accordance with the invention.

FIGS. 1 are 2 are diagrammatic. In FIG. 1, the valve is shown placed between a vacuum enclosure 22 and an apparatus 23 such as a beam generator, for example. The valve in the vicinity of the apparatus 23 is extra flat.

With reference to all three figures, the valve shown comprises a valve body 1 which is hollow and disposed about an axis Δ. The inside cavity 2 of the valve body opens to the outside via two end openings 24 and 25 which face each other and whose sides have sealed bellows connections 26 and 27 fitted with gaskets 28 and 29 pressing thereagainst, with said vacuum connections being respectively connected to the apparatus 23 and to the vacuum enclosure 22.

The closure member situated inside the valve body between the two openings 24 and 25 is constituted by a closure strip 7.

This closure strip may be constituted by a metal foil or by a strip of impermeable synthetic material or by a strip of synthetic material covered with a metal deposit. It is also possible to use thick hinged plates which are fixed on thin strips when making use of large flow passages.

The closure strip 7 includes a circular opening 8 which is slightly greater in size than the openings 24 and 25 if it is desired to produce a full-opening valve. In some applications, it may be desired to provide a valve having an opening whose conductivity varies as a function of the position of the strip relative to the axis Δ. In this case, a strip may be provided which includes a plurality of openings of various shapes and/or areas.

The closure strip 7 is movable in its own plane, i.e. perpendicularly to the axis Δ. To make this possible, it is connected at each of its ends to a drum. There are therefore two drums 9 and 10 situated in the valve body on opposite sides of the internal fluid-passing section 11. These drums 9 and 10 pay out and take up the strip, thereby enabling the center of the opening 8 to be brought into coincidence with the axis Δ, or alternatively enabling the strip to be moved so as to close the fluid-passing section 11. These pay-out and take-up drums are provided with motor means, not shown.

The drums 9 and 10 are situated in respective chambers 12 and 13 of the overall cavity 2 of the valve body 1. As can be seen in the figures, the valve body 1 is flat and elongate, with the chambers 12 and 13 that contain the drums 9 and 10 being offset away from the bulk of the apparatus 23.

Between the two chambers 12 and 13, the valve body includes sealing means capable of pressing on either side of the closure strip 7 and serving firstly, when the valve is in the closure position, to provide sealing between the two end openings of the valve body, with the fluid-passing section 11 being closed and with the sealing means being brought into play, and secondly, when so desired, sealing of the inside of the valve, i.e. the portion 11 of the general valve cavity 2 relative to the chambers 12 and 13 in the open position of the valve when the opening 8 of the strip is in a position which does not close the duct 11, i.e. during pumping, by compressing the sealing means. This makes it possible to pump out the chambers 12 and 13 separately.

To this end, the valve body includes an orifice 14 suitable for connection to a pump.

The above-mentioned sealing means comprise a fixed gasket 15 connected to the valve body and situated on a first side of the closure strip 7, and a moving gasket system capable of moving parallel to the axis Δ. This moving gasket system is situated on the other side of the closure strip 7 from the fixed gasket 15 and comprises a plurality of balls 30, e.g. 3 balls, which are spaced apart at 120° from each other around a circumference by means of a cage 31. The cage 31 is rotatable and includes a lever 32 (see FIG. 2) connected to an operating rod 33.

The balls 30 and the cage 31 are placed between a clamping ring 34 provided with conical depressions 35 for positioning the balls, and a flat portion 36 of the valve body 1 which also includes ball-receiving conical depressions 37.

The conical depressions 35 are situated facing the conical depressions 37. When the cage 31 is in a position such that the balls 30 are positioned in the depressions 35 and 37, the clamping ring 34 is not pressed against the fixed gasket 15 and a return ring 38 provided with a return spring 39 serves to move the clamping ring 34 away from the fixed gasket 15.

During displacement of the closure strip 7, the strip is lightly clamped between the clamping ring 34 and the return ring 38. However, the force of the return spring 39 is selected to ensure that said clamping is only light.

By rotating the cage 31 through an angle α, the cage moves the balls out from the conical depressions 35 and 36, thereby raising the clamping ring 34 as can be seen in the lefthand half of FIG. 3 and thus pressing the strip 7 against the fixed gasket 15.

While the clamping ring 34 is moving, it slides axially in sealed manner along a cylindrical bearing surface 40 inside the valve body 1. A friction sealing gasket (not shown) may be disposed between the ring 34 and the portion 40. A lug 41 prevents the clamping ring 34 from rotating.

Figure 2:
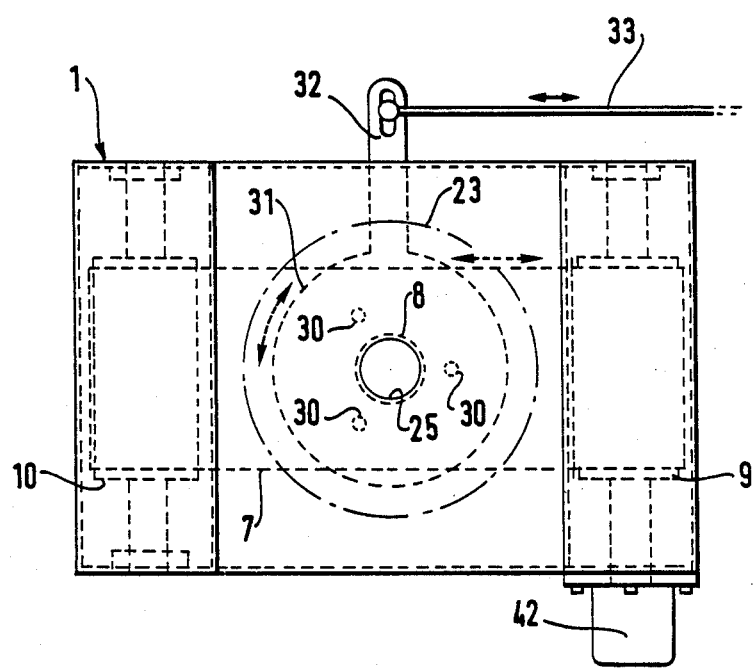

FIG. 2 shows a motor 42 for driving the drum 9.

In FIG. 3, the drums 9 and 10 are not shown, and only the beginnings of the chambers 12 and 13 are shown. In the lefthand half of this figure, the valve is shown in its open position with the gasket system compressed, thereby providing internal sealing of the valve, whereas in the righthand half of the figure, the gasket system is released and the closure strip 7 has been displaced to a position for closing the duct 11, after which the gasket should again be compressed.

Operation is as follows:

During pumping, the closure strip 7 is placed in such a manner that its opening 8 is coaxial with the axis Δ. If internal valve sealing is required, the moving gasket system is compressed by pulling on the operating rod 33.

In order to close the valve, the clamping of the closure strip 7 is released if the moving gasket system has been compressed, and the strip 7 is moved by driving the drum 10 until the opening 8 has been taken fully away from the inside area of the gasket 15. The moving gasket is then pressed against the fixed gasket 15 by acting on the lever 33.

In the position shown in the lefthand half of FIG. 3, the valve is opened and the gasket system is clamped, thereby providing internal valve sealing, thus enabling degassing of the compartments 12 and 13 to be avoided. Further, when the gasket system is clamped, the orifice 14 makes it possible to pump the compartments 12 and 13 independently, thereby giving rise to a completely clean vacuum and avoiding significant pressure increases when the closure strip 7 is displaced.

I claim:

1. A valve for a vacuum enclosure, the valve comprising a valve body which is hollow about an axis Δ and which opens out to the outside via two opposite end openings of the valve body, thereby enabling the valve to be inserted in a pumping circuit, the inside of said valve body being provided by closure means constituted by a strip which is movable in its own plane, which plane extends perpendicularly to the axis Δ, said strip being provided with at least one opening and being associated with two pay-out and take-up drums provided with drive means, said valve body being further provided with sealing means situated between the two drums and comprising a fixed gasket fixed to the valve body and situated on a first side of the strip and a moving gasket system capable of moving parallel to the axis Δ and situated on the other side of the strip from the fixed gasket, wherein said moving gasket system includes a plurality of balls which are held spaced apart from one another around a circumference by means of a rotatable cage, the assembly comprising said balls and said cage being disposed between a clamping ring which is axially displacable and which is provided with conical depressions for receiving the balls and a plane portion of the valve body which is also provided with conical depressions for receiving the balls, said cage being associated with means enabling it to be rotated through an angle α, the clamping ring being axially slidable in sealed manner along a cylindrical bearing surface inside said valve body, and wherein the valve body includes a return ring situated on the same side of the strip as said fixed gasket and subjected to the force of a return spring directed towards said strip with said return spring exerting a light force on said return ring sufficient to move said clamping ring away from said fixed gasket with said balls received within said conical depressions.

* * * * *